Aug. 21, 1956     H. REID     2,759,366
CAM MOVEMENT
Filed Feb. 11, 1953     2 Sheets-Sheet 2
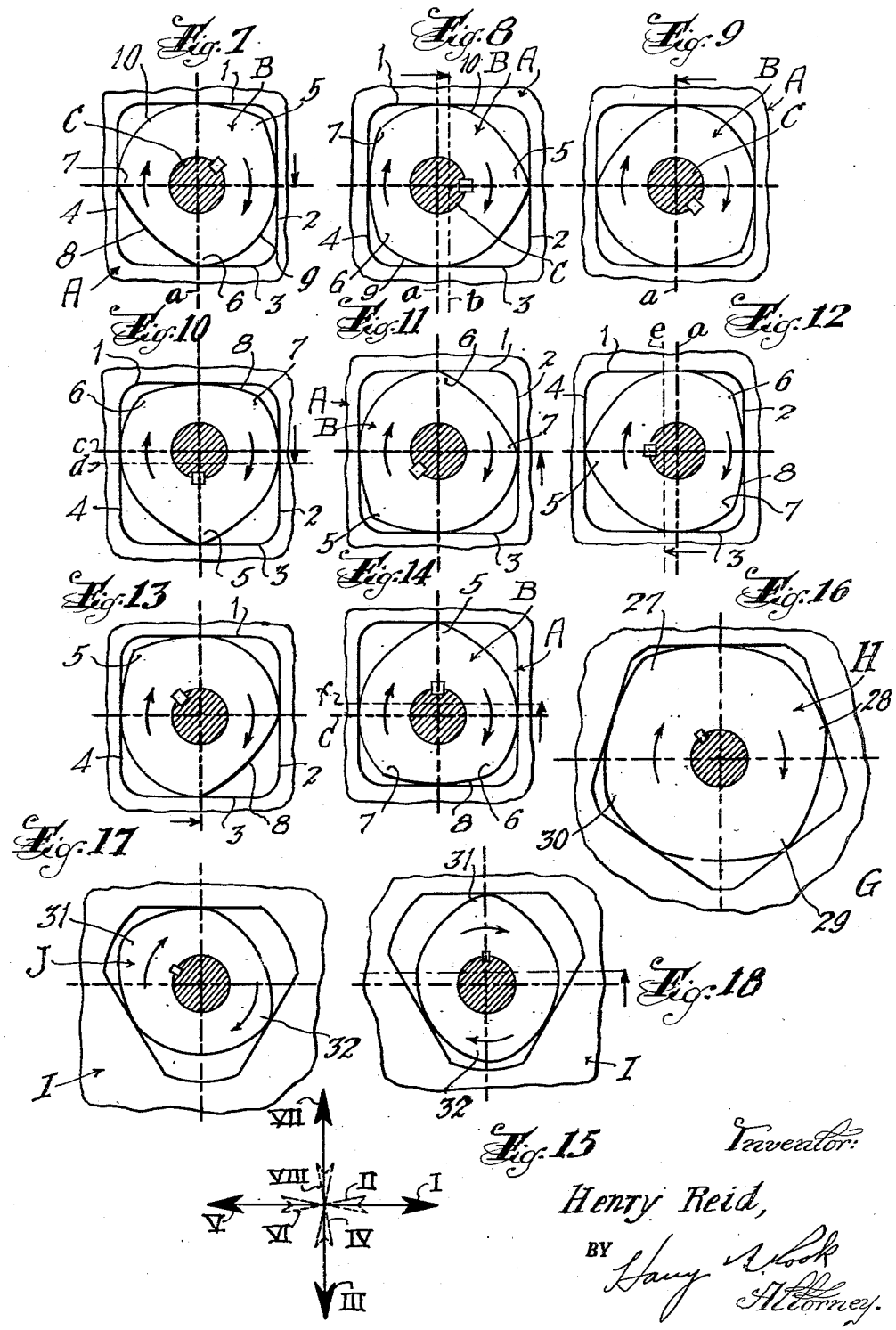
Inventor:
Henry Reid,
BY

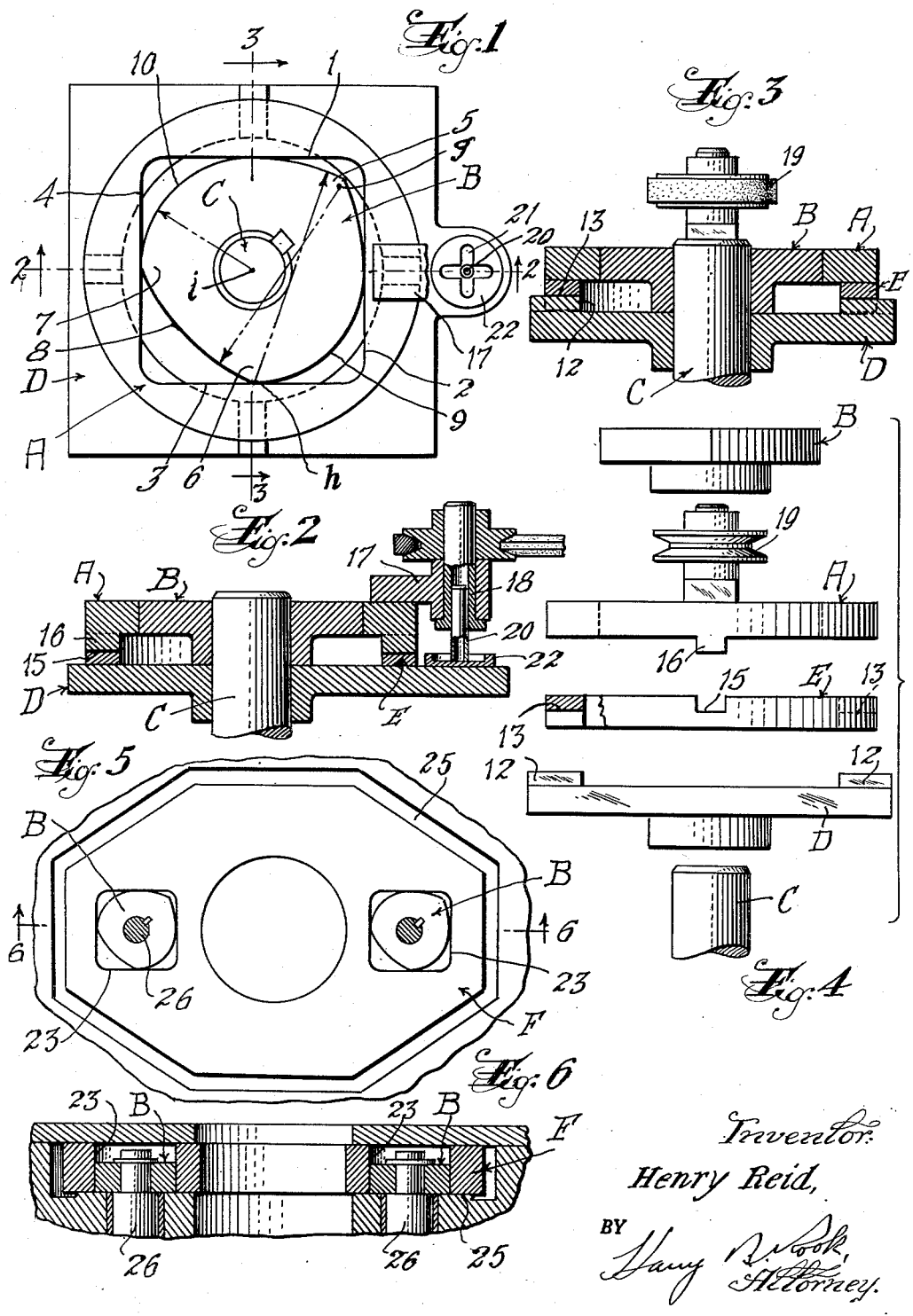

United States Patent Office 2,759,366
Patented Aug. 21, 1956

2,759,366

CAM MOVEMENT

Henry Reid, West Orange, N. J.

Application February 11, 1953, Serial No. 336,219

3 Claims. (Cl. 74—55)

This invention relates in general to a cam movement for translating a rotary movement into straight-line movements in different directions; and one object of the invention is to provide a cam movement which shall comprise a rotary cam and an annular follower encircling and operated by the cam whereby the follower can be moved from and to a central position concentric with the axis of rotation of the cam along each of a plurality of straight lines that are radial to said axis.

Another object is to provide such a cam movement wherein the follower shall be polygonal and have sides of equal lengths and said cam shall have a peripheral primary lobe and at least one complementary lobe contoured to coact with the sides of the follower upon rotation of the cam and move the follower rectilinearly or along a straight line from and to a central position concentric with said aixs each time said primary lobe is moved successively into and out of contact with any side of the follower respectively, and the periphery of the cam shall also have a curved surface contoured for engagement with each side of the follower during said movement of the primary lobe to prevent all other movement of said follower in directions radial to said axis.

Other objects, advantages and results of the invention will be brought out by the following description in conjunction with the accompanying drawings.

It is contemplated that the cam movement can be used for many purposes, but for illustrating the principles of the invention, I have shown in the accompanying drawings the cam movement adapted to the manipulation of a cutting tool.

In said drawings:

Fig. 1 is a schematic top plan view of the cam movement with portions of the holder for the cutting tool omitted;

Fig. 2 is a vertical longitudinal sectional view approximately on the plane of the line 2—2 of Fig. 1 with the cutting tool and its holder mounted on the cam movement;

Fig. 3 is a transverse vertical sectional view approximately on the plane of the line 3—3 of Fig. 1;

Fig. 4 is an exploded side elevational view of the parts of the apparatus shown in Figs. 1 and 2;

Fig. 5 is a schematic top plan view showing a plurality of cams and another type of cam follower;

Fig. 6 is a vertical longitudinal sectional view approximately on the plane of the line 6—6 of Fig. 5;

Figs. 7, 8, 9, 10, 11, 12, 13 and 14 illustrate successive positions of the cam and follower during one complete revolution of the cam in one direction, Figs. 7, 9, 11 and 13 showing the follower in its position concentric with the axis of the cam;

Fig. 15 is a diagram of the various movements of the cam follower;

Fig. 16 is a view similar to Fig. 7 with a polygonal follower having five sides instead of four sides as does the follower in Fig. 7;

Fig. 17 is a similar view showing a three sided polygonal follower with the follower in its central position;

Fig. 18 shows the first step in the movement of the cam in the direction of the arrows.

Specifically describing the embodiment of the invention shown in Figs. 1 to 4 inclusive and Figs. 7 to 15 inclusive, the cam movement is shown as comprising a cam follower A of annular form and encircling a cam B that is rotatable about the axis of the shaft C on which the cam is keyed or otherwise fastened. The follower is illustrated in the form of a plate having a central equiangular polygonal opening comprising four straight sides or walls 1, 2, 3 and 4 of equal length.

The cam has on its peripheral surface convex portions including a primary lobe and two complementary lobes 6 and 7 which are contoured to coact with the side walls of the opening of the follower upon rotation of the cam and move the follower along a line radial to said axis each time the primary lobe 5 is moved successively into and out of contact with any side 1, 2, 3 or 4 of the follower ring; and the cam also has a curved surface contoured for engagement with each side of the follower during said movement of the primary lobe to prevent all other movements of said follower along lines radial to said axis.

In Figs. 1 and 7, the cam and follower are shown in their relative positions when the follower is central or concentric with the axis of rotation of the cam, that is, the axis of the shaft C. As the cam is rotated from that position in the direction of the arrows, the primary lobe 5 moves into engagement with the side 2 of the follower and thus actuates the follower away from said central or concentric position a distance indicated by the distance between the heavy and light dot and dash lines *a, b* in Fig. 8, the line *a* passing through the axis of rotation of the cam. The surface 8 of the cam between the complementary lobes 6 and 7 constitutes the drop of the cam and permits said movement of the follower, and the sides of the lobe 5 as well as surfaces 9 and 10 on the periphery of the cam slidably engage respective sides of the follower during said movement of the primary lobe, the surfaces 9 and 10 being coaxial with the shaft C as shown. Then, as the lobe continues its movement out of engagement with said side 2 of the follower into the position shown in Fig. 9, the follower is moved backwardly or returned to its said central or concentric position. These movements of the follower from and to said concentric position are indicated in Fig. 15 by the arrows I, II.

Continued rotation of the cam in the same direction causes engagement of the primary lobe 5 with the next adjacent side 3 of the follower so as to move the follower from the central or concentric position a distance equal to the distance between the heavy and light broken lines *c, d* in Fig. 10, the line *c* passing through the axis of rotation of the cam. As the cam continues to rotate, the lobe 5 moves away from said side 3 and the complementary lobe 6 returns the follower to its central or concentric position as shown in Fig. 11. These two movements are indicated by the Roman numerals III and IV in Fig. 15.

Upon continued rotation of the cam in said direction, the primary lobe 5 then engages the side 4 of the follower and actuates the follower to the left away from the central or concentric position a distance equal to the distance between the broken lines *a, e* in Fig. 12, and during further movement of the cam, the complementary lobe 6 returns the follower to its central or concentric position as shown in Fig. 13. These movements are indicated by Roman numerals V and VI of Fig. 15. The next step of movement is illustrated in Fig. 14 where the main lobe 5 has actuated the follower upwardly a distance equal to the distance between the lines c and f of Fig. 14. Obviously the next step in rotation of the cam will return the follower to its central or concentric position as shown in Fig. 7, these last movements of the follower being designated VII and VIII in Fig. 15.

It will be understood by those skilled in the art that the size of the polygonal follower may be modified as required to effect the desired distance of movement of the follower, the high point of the lobe 5 always being a distance from the axis of rotation of the cam equal to the radius of a circle inscribed in the opening of the polygonal follower plus the length of the desired movement of the follower from its central or concentric position, and the high points of the complementary lobes being spaced from said axis a distance equal to the radius of said inscribed circle. The centers of the arcs of the various surfaces of the cams can be readily calculated but for the purpose of illustration, I have shown in Fig. 1 the center of the curved surface between the complementary lobes 6 and 7 designated g, and the centers of the surfaces of the lobe 5 designated h and being actually the high points of the complementary lobes 6 and 7. The surfaces 9 and 10 are concentric with the shaft C, their common center being designated i.

Any suitable means may be utilized for mounting the follower for straight-line movements along lines perpendicular to the respective sides of the follower in response to the forces applied to the follower by the cam. As shown, there is a base plate D through which the shaft C projects and said plate has diametrically disposed upstanding lugs or ribs 12 which slidably seat in similarly shaped grooves 13 in one side of a ring E in the other side of which are grooves 15 that are disposed on a diametral line perpendicular to the diametral line on which the grooves 13 are disposed; and the follower plate A has diametrically disposed ribs or lugs 16 that slidably fit into grooves 15. With this construction when the follower plate is urged to the right or to the left of Fig. 1 by the cam, the follower plate may slide on the ring E which is held against sliding in the same direction by the lugs 12, while when the follower plate is urged upwardly or downwardly in Fig. 1, the follower plate and ring E will move together and the ring E will slide on the base plate D.

As hereinbefore indicated the follower plate can be used for various purposes, for example, to manipulate a cutting tool; and a cutting tool holder bracket 17 is shown as mounted on the top of the follower plate and projecting from one side thereof with a hollow tool spindle 18 journaled therein and driven through a belt and pulley connection by a suitable source of power. A suitable cutting tool 20 is mounted in the spindle for, in the present instance, providing grooves or depressions 21 in a work piece 22 that may be clamped on the base plate in any suitable manner, for example, adhesively or electro-magnetically. It will be noted that the depression or groove 21 comprises 4 arms each of which was formed during movement of the primary lobe of the cam into and out of engagement with one side of the follower and the consequent movement of the follower from and to its central or concentric position, respectively.

Figures 5 and 6 show a modification of the invention comprising two cams B identical with the cam hereinbefore described, each cam being disposed within a square opening 23 in a plate F which is slidably mounted on a bed 25. The cams are mounted on the shafts 26 which are driven synchronously. In operation of the apparatus, the plate E is moved in exactly the same way in which the follower plate A is moved. A cutter or other device could be mounted on a follower plate F or said follower plate could be connected to any other mechanism to be actuated.

Figure 16 shows a follower G having five sides instead of four sides as shown in Figs. 1 and 7, and the lobes and other surfaces of the cam are correspondingly modified, but the cam H will include a primary lobe 27 and complementary lobes 28, 29 and 30, the surfaces on the periphery of the cam being such that there is a curved surface contoured for engagement with each side of the follower during movement of the primary lobe into and out of contact with any side of the follower, said surfaces holding the follower against movement in all directions radially to the axis of rotation of the cam except the direction in which the follower is urged by the primary lobe and complementary lobes.

Figures 17 and 18 show another modification of the invention wherein the follower plate I has a three sided opening and the cam will be correspondingly contoured, having a primary lobe 31, a complementary lobe 32, the peripheral surfaces of the cam being contoured so that there is a curved surface in engagement with each side of the follower during movement of the primary lobe into and out of contact with any side of the follower.

It will be seen that the invention provides a simple and reliable cam movement whereby a device may be actuated through a series of rectilinear motions radial to the axis of rotation of the cam and particularly whereby the article can be moved from and to a central position along each of a large number of radially disposed lines.

What I claim is:

1. A cam movement including a cam freely rotatable about an axis, and a polygonal annular follower encircling said cam and movable in a flat plane perpendicular to said axis, said follower having straight equilateral equiangularly related inner walls each of which is in direct sliding contact with the periphery of the cam for operation of said follower by the cam in said plane, the periphery of said cam being contoured with convex surfaces including a primary lobe and at least one complementary lobe directly frictionally engageable and cooperative with the inner walls of the follower upon rotation of the cam continuously in one direction with the periphery of said cam constantly in contact with all of said inner walls of the follower, means mounting said follower for rectilinear movement along straight lines that are both radial to said axis and perpendicular to the respective walls of said follower, said convex surfaces moving said follower in said plane along a straight line radially to said axis from a central position concentric with said axis each time said primary lobe is moved into contact with any wall of the follower, and said convex surfaces moving said follower along said straight line back to said central position each time said primary lobe is moved out of contact with said wall of said follower, there being one of said convex surfaces in engagement with each of the other walls of the follower continuously during movement of said primary lobe into and out of contact with said wall of the follower to prevent all movement of said follower in said plane other than said movement along said straight line.

2. A cam movement as defined in claim 1 wherein said primary lobe has a high point spaced from the axis a distance equal to the radius of a circle inscribed in said polygonal follower plus the length of the desired movement of said follower from said central or concentric position, and each complementary lobe has a point spaced from said axis a distance equal to the radius of said inscribed circle.

3. A cam movement including two cams rotatable synchronously about spaced parallel axes, and a follower having two identical polygonal openings in each of which one of said cams is rotatable with its periphery in slidable engagement with the walls of the opening, each cam having on its periphery a primary lobe and at least one complementary lobe contoured to coact with the walls of the corresponding opening upon rotation of the cams to move the follower in a flat plane along a straight line from and to a central position wherein each said opening is concentric with the said axis of rotation of the corresponding cam each time said primary lobe of each cam moves respectively into and out of contact with a wall of its said opening that corresponds to a wall of the other opening, the periphery of each cam having a curved surface contoured for engagement with each wall of the corresponding opening during said movement of said primary lobes to prevent movement of said follower in all other directions in said plane.

References Cited in the file of this patent

UNITED STATES PATENTS

| | | |
|---|---|---|
| 514,736 | Sloan | Feb. 13, 1894 |
| 1,107,837 | Pitt | Aug. 18, 1914 |
| 1,152,600 | Carleton | Sept. 7, 1915 |
| 1,268,874 | Nelson | June 11, 1918 |
| 2,151,695 | Goddard | Mar. 28, 1939 |

FOREIGN PATENTS

| | | |
|---|---|---|
| 465,594 | Germany | Sept. 26, 1928 |